Dec. 27, 1955  J. J. ZIMMERMAN  2,728,890
ENERGIZED CONVEYOR ASSEMBLY
Filed Nov. 12, 1952  3 Sheets—Sheet 2
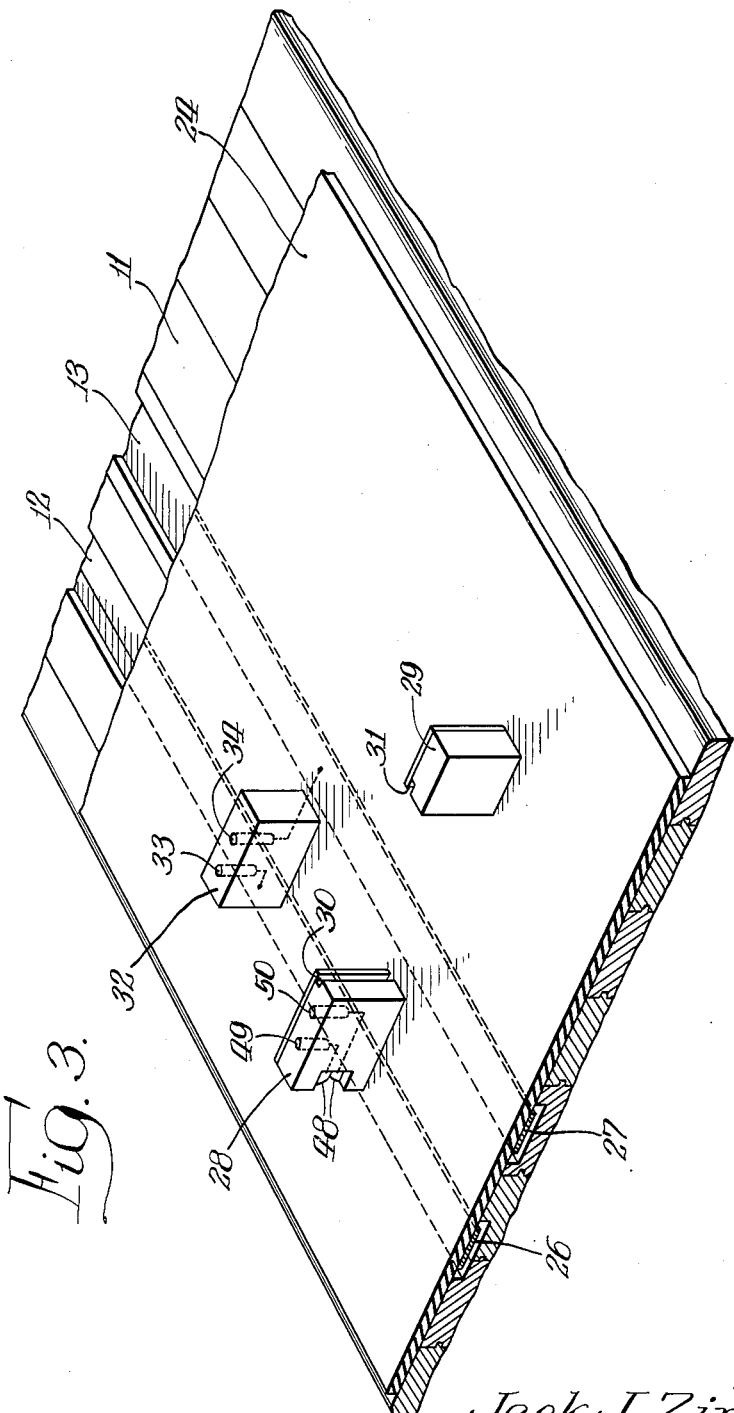
INVENTOR.
Jack J. Zimmerman,
BY
Norman L. Mueller
Atty.

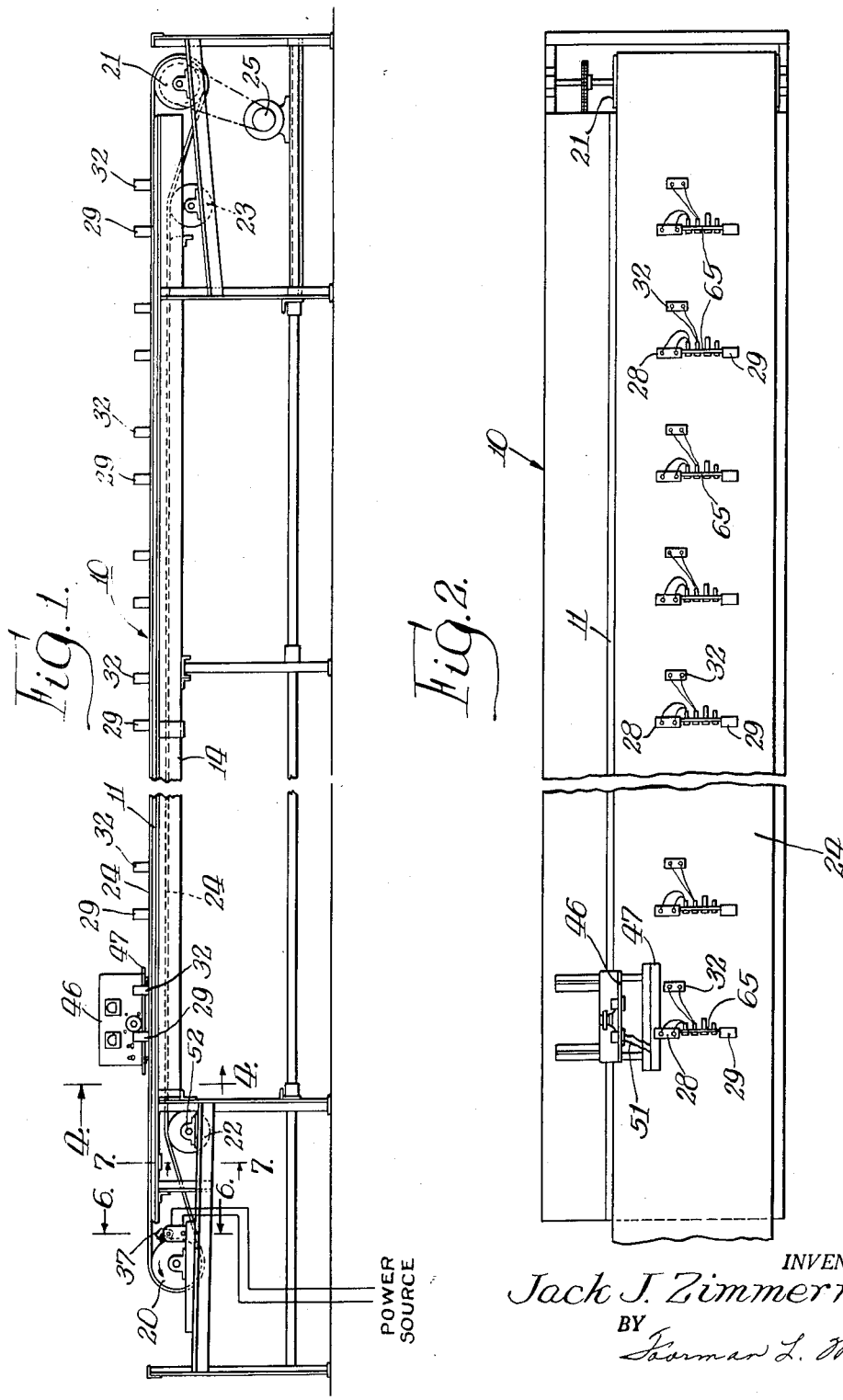

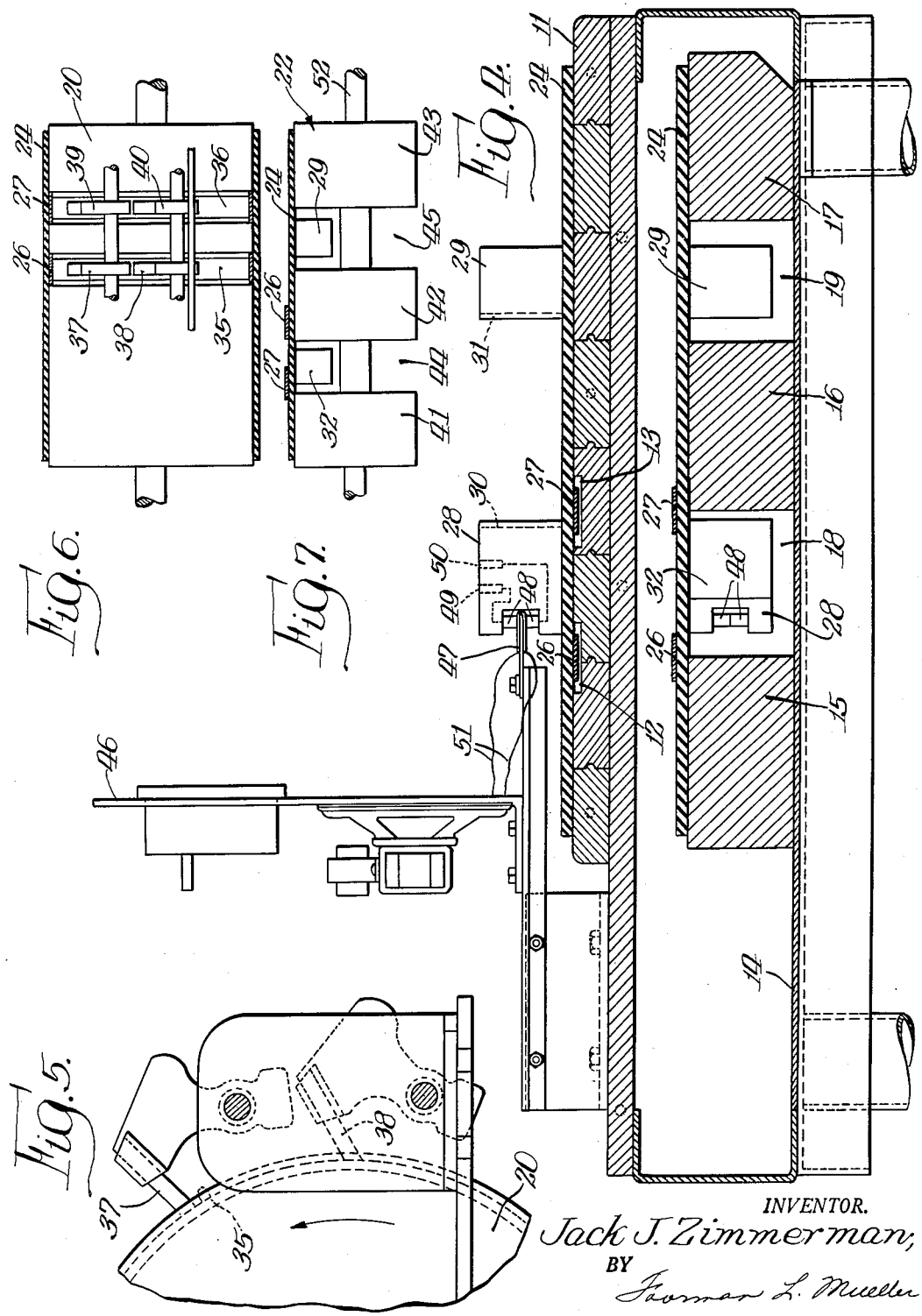

United States Patent Office 2,728,890
Patented Dec. 27, 1955

2,728,890

ENERGIZED CONVEYOR ASSEMBLY

Jack J. Zimmerman, Riverside, Ill., assignor to Motorola, Inc., Chicago, Ill., a corporation of Illinois Application November 12, 1952, Serial No. 319,957

8 Claims. (Cl. 324—158)

This invention relates to an improved conveyor assembly by means of which electrical units, such as radio or television receivers or the chassis of such receivers, may be tested and adjusted during the course of their manufacture in a continuous and sequential fashion. More particularly, the invention relates to an improved conveyor belt for carrying the above units and which is constructed so that the units carried by the belt may be electrically energized for testing and adjusting purposes.

In accordance with modern manufacturing techniques, radio and television receivers and the like are usually fabricated by means of an assembly line in which the chassis of such receivers are moved continuously from one end to the other. Various persons are stationed along the line who insert the necessary electrical components into the chassis moving in front of them, while subsequent persons interconnect and solder the various components. At the end of the line, the chassis are usually placed in their cabinets and stacked for testing and adjusting. Unlike the previous manufacturing steps, the handling of the units for testing and adjustment purposes is usually intermittent rather than continuous and this interrupts the smooth flow of the assembly and decreases the over-all efficiency. In other words, present procedures in which operators at one or more testing stations are each provided with a quantity of units from time to time requires unnecessary handling of the units and is inefficient.

It is an object of the present invention to provide an improved conveyor belt for carrying electrical units to be tested and adjusted, by means of which the necessary operations may be performed in a continuous and sequential fashion and not intermittently as is usually the present practice.

A feature of the invention is the provision of an improved conveyor belt which is arranged so that electrical units carried thereby may be electrically energized for testing and adjustment purposes while the units are in motion.

The above and other features of the invention which are believed to be new are set forth with particularity in the appended claims. The invention itself, however, together with further objects and advantages thereof may best be understood by reference to the following description when taken in conjunction with the accompanying drawings in which:

Fig. 1 shows a side elevation of the improved conveyor belt of the present invention, Fig. 2 is a top view of the conveyer, Fig. 3 is a perspective view of a section of the conveyor belt, Fig. 4 is a sectional view taken along the lines 4—4 of Fig. 1, Fig. 5 is an enlarged representation of a portion of the invention, and Figs. 6 and 7 are sectional views taken respectively along the lines 6—6 and 7—7 of Fig. 1.

As previously stated, the assembly of this invention is intended to convey electrical units to be tested and adjusted, and the purpose of the assembly is to supply electrical energy to such units while carried thereby. The assembly comprises a supporting table with a pair of rollers respectively supported at opposite ends of the table. A continuous belt encircles the rollers and the top of the table with the lower surface of its upper portion resting on the top. Driving means is mechanically coupled to one of the rollers for moving the belt, and a plurality of electrical outlet receptacles are mounted on the belt and spaced along the outer surface thereof. Suitable electrical conductor means are secured to the belt and connected to the outlet receptacles, and an energizing means is provided which engages a moving portion of the assembly in electrical connection with the conductor means for supplying electrical energy to the outlet receptacles from a stationary electrical source.

With reference now to the drawings, the electrically energized conveyor assembly of this invention includes a supporting table 10 which includes a top 11 having a pair of spaced parallel channels 12, 13 extending along the length of its upper surface. The table also includes a shelf 14 which has three supporting members 15, 16 and 17 (Fig. 4) mounted thereon in spaced parallel relation and which extend along the length of the table to define passages 18 and 19 therebetween.

The assembly also includes a pair of roller members 20 and 21 supported on the table at opposite ends of the table top 11, and includes a further pair of roller members 22 and 23 mounted on the table adjacent respective rollers 20 and 21. A continuous belt 24 encircles rollers 20 and 21 and the top of the table with the lower surface of its upper portion resting on the top and the lower surface of its lower portion resting on supporting members 15, 16 and 17. The belt also passes over rollers 22 and 23, the latter rollers being adjustable in a longitudinal direction to maintain a desired degree of tautness to the belt. An electric motor 25 is mechanically coupled to roller 21 to rotate the roller and impart motion to the belt.

Two spaced parallel flexible strips 26 and 27 of conductive material are secured to and extend lengthwise around the inner surface of the belt, the strips passing through the channels 12 and 13 on the top of the table. A plurality of pairs of brackets 28 and 29 are mounted on the belt and spaced along its outer surface. These brackets are mounted on respective transverse axes of the belt and for the purposes of the present discussion will be assumed to be designed to support a series of radio receivers chassis panels 65, as shown in Fig. 2. Panels 65 are illustrated as supported in an upright position transversely of the belt; but of course the panels can be supported in other positions, and other electrical units which require testing may likewise be supported by suitable brackets or may merely rest on the belt itself.

The pairs of brackets 28, 29 are spaced along the belt in such a fashion that a succession of radio panels 65 can be sequentially inserted at one end of the belt and carried along the length of the table and then removed at the other end. A plurality of electrical outlet blocks 32 are mounted on the belt adjacent respective pairs of brackets 28, 29. Each outlet block 32 contains a pair of electrical receptacles 33 and 34 (Fig. 3) which are respectively connected through the belt to the conductive strips 26 and 27. On the return motion of the belt under the table, the brackets 28 and 29 and outlets 32 pass upside down through the passages 18 and 19 between the supporting numbers 15, 16 and 17 on the table shelf 14.

As shown in Fig. 6, roller 20 has a pair of spaced annular conductive members 35 and 36 supported thereon, and these members make electrical contact with the flexible strips 26 and 27 of belt 24. The flexible strips roll over the annular members to provide a relatively large contact area to provide a good electrical connection with relatively high current carrying capacity.

A pair of energizing brushes 37 and 38 is supported in known manner so that each brush is resiliently biased into engagement with annular conductive member 35 (see Fig. 5). Another pair of brushes 39 and 40 is supported in like manner to engage annular conductive member 36. The use of two brushes for each annular member reduces current interruption due to foreign matter on the annular members, and correspondingly reduces resulting electrical interference in the circuits of the supported radio panels 65. This obtains since should such foreign matter lift one of the brushes from its annular member and break electrical connection contact is still established through the other. The brushes are connected to a suitable electric source, and energy from this source is transmitted therethrough, and through annular members 35, 36 and flexible strips 26, 27, to outlet blocks 32.

With this arrangement, the panels 65 supported between brackets 28, 29, may have their energizing leads plugged into the associated outlet blocks 32 so that their electronic circuits may be electrically energized as the panels are moved by the belt.

The construction of rollers 22 and 23 is shown in Figure 7, and it can be seen that each is composed of three roller sections 41, 42 and 43 spaced along shaft 52 to define passages 44 and 45 therebetween so that the pairs of brackets 28 and 29 and outlet blocks 32 can pass unimpeded through these rollers.

A suitable testing station 46 is mounted on the table for testing the electronic circuits of panels 65. Station 46 is preferably positioned near one end of the belt so that the electronic circuits of the various panels 65 inserted in brackets 28, 29 at the other end of the belt undergo their "warm up" period during their conveyance by the belt to the testing station. In this manner, testing can be accomplished in a continuous fashion as the panels pass in front of the testing station, and there is no need for periods of inaction as the various components on the panels 65 are brought to operating temperature.

The testing station includes a track 47 including a pair of mutually insulated conductive sections, and which breaks a pair of contacts 48 on each bracket 28 as such bracket moves in front of the testing station and connects such contacts to the testing circuit. With this arrangement, the panels 65 supported in the brackets may have the output leads from their electronic circuits connected to electrical sockets 49 and 50 in each bracket 28 (Fig. 3), these sockets being connected to the respective contacts 48 to be short circuited thereby until the bracket moves in front of the testing station, when bracket 28 is in the latter position, contacts 48 are broken and sockets 49 and 50 are respectively connected to the electrical testing equipment in station 46 through the sections of track 47 and interconnecting leads 51. The particular connection between bracket 28 and the testing station is given merely by way of example for other types of connection may be used depending upon the desired test to be made on the electrical units.

The invention provides, therefore, an extremely simple arrangement for greatly increasing the efficiency of the manufacturing process of radio receivers and other electrical units. By means of the present invention, the various electrical units may be placed in succession on one end of a conveyor belt, moved to the testing station, and removed successively from the other end of the belt. In this fashion, the manufacturing process may proceed in a continuous and efficient manner without time consuming and cost increasing interruptions while the receivers are individually handled for testing and adjustment purposes.

While a particular embodiment of the invention has been shown and described, modifications may be made and it is intended in the appended claims to cover all such modifications as fall within the true spirit and scope of the invention.

I claim:

1. A conveyor assembly for conveying electrical units and for supplying electrical energy to such units while in motion including in combination, a pair of rollers supported in spaced relation one from the other, a continuous belt encircling said rollers, driving means mechanically coupled to one of said rollers for moving said belt, a pair of spaced parallel flexible strips of conductive material secured to and extending lengthwise around the inner surface of said belt, a plurality of electrical outlets mounted on said belt in spaced relation along the outer surface thereof and electrically connected through said belt to said strips, a pair of spaced annular conductive members supported on one of said rollers in coaxial relation therewith for electrically engaging said flexible strips, and a pair of energizing brushes respectively engaging said annular members for supplying electrical energy thereto from a stationary source.

2. A conveyor assembly for conveying electrical units and for supplying electrical energy to such units while in motion including in combination, a supporting table, a pair of rollers respectively supported at opposite ends of said table, a continuous belt encircling said rollers and the top of said table with the lower surface of its upper portion resting on said top, driving means mechanically coupled to one of said rollers for moving said belt, a pair of spaced parallel flexible strips of conductive material secured to and extending lengthwise around the inner surface of said belt, a plurality of brackets for supporting electrical units to be tested mounted on said belt and spaced along the outer surface thereof, a plurality of electrical outlets mounted on said belt adjacent respective ones of said brackets and electrically connected through said belt to said strips, a pair of spaced annular conductive members supported on one of said rollers coaxially therewith for electrically engaging said flexible strips, and a pair of energizing brushes respectively engaging said annular members for supplying electrical energy thereto.

3. A conveyor assembly for conveying electrical units while in motion and for supplying electrical energy to such units including in combination, a rectangular supporting table having a pair of spaced parallel channels extending along the length of the upper surface of its top and further having a shelf extending along the length of said table below said top and having a plurality of spaced parallel supporting members mounted thereon extending along the length of the table and defining passages therebetween, a pair of roller members supported at opposite ends of the table, a continuous belt encircling said rollers and the top of said table with the lower surface of its upper portion resting on said top and the lower surface of its lower portion resting on said supporting members, driving means mechanically coupled to one of said rollers for moving said belt, a pair of spaced parallel flexible strips of conductive material secured to and extending lengthwise around the inner surface of said belt and passing through the aforesaid channels in the top of said table, a plurality of brackets for supporting electrical units to be tested mounted on said belt and spaced along the outer surface thereof, a plurality of electrical outlets mounted on said belt adjacent respective ones of said brackets and electrically connected through said belt to said strips, said brackets and said outlets passing through the aforesaid passages between said supporting members on said shelf, a pair of spaced annular conductive members supported on one of said rollers coaxially therewith for electrically engaging said flexible strips, and a pair of energizing brushes respectively engaging said annular members for supplying electrical energy thereto from a stationary source.

4. An assembly for conveying electrical units and for supplying electrical energy to such units while in motion including in combination, a pair of rotatable members supported in spaced relation from one another, a continuous conveyor means encircling said rotatable members, driving means rotatably coupled to at least one of said rotatable members for moving said conveyor means, a pair of spaced mutually insulated electrical conductors secured to and extending lengthwise around the inner surface of said conveyor means, a plurality of electrical outlets mounted on said conveyor means in spaced relation along the outer surface thereof and electrically connected through said conveyor means to said conductors, a pair of spaced annular conductive members supported on one of said rotatable members in coaxial relation therewith and respectively engaging said conductors for electrically energizing said conductors, and at least one pair of energizing brushes engaging said annular members for supplying electrical energy thereto from a stationary source.

5. An assembly for conveying electrical units and for supplying electrical energy to such units while in motion including in combination, a pair of rotatable members supported in spaced relation one from the other, a continuous conveyor means encircling said rotatable members, driving means rotatably coupled to at least one of said rotatable members for moving said conveyor means, a pair of spaced mutually insulated electrical conductors secured to and extending lengthwise around the inner surface of said conveyor means, a pair of spaced annular conductive members supported on one of said rotatable members in coaxial relation therewith and respectively establishing a rolling contact with said conductors, a first pair of energizing brushes mounted adjacent said one of said rotatable members and resiliently biased into electrical contact with one of said annular conductive members at respective points on the peripheral surface thereof, and a second pair of energizing brushes mounted adjacent said one of said rotatable members and resiliently biased into electrical contact with the other of said annular conductive members at respective points on the peripheral surface thereof.

6. An assembly for conveying electrical units and for supplying electrical energy to such units while in motion including in combination, a pair of rotatable members supported in spaced relation from one another, a continuous conveyor means encircling said rotatable members, driving means rotatably coupled to at least one of said rotatable members for moving said conveyor means, a pair of spaced mutually insulated electrical conductors secured to and extending lengthwise around the inner surface of said conveyor means, a plurality of electrical outlets mounted on said conveyor means in spaced relation along the outer surface thereof and electrically connected through said conveyor means to said conductors, a pair of spaced annular conductive members supported on one of said rotatable members in coaxial relation therewith and respectively engaging said conductors for electrically energizing said conductors, at least one pair of energizing brushes engaging said annular members for supplying electrical energy thereto from a stationary source, a plurality of brackets for the units mounted on said conveyor means and respectively disposed adjacent said receptacles, each of said brackets having a receptacle means therein and having contact means connected to said last mentioned receptacle means, a stationary testing station supported adjacent conveyor means, and electrically conductive means connected to said testing station and adapted to establish electrical contact with said contact means in said brackets as said brackets are moved past said testing station by said conveyor means.

7. An assembly for testing electrical units while in motion including in combination, a pair of rotatable members supported in spaced relation one from the other, a continuous conveyor means for the electrical units encircling said rotatable members, driving means rotatably coupled to at least one of said rotatable members for moving said conveyor means, a pair of spaced mutually insulated electrical conductors secured to and extending lengthwise around the inner surface of said conveyor means, a plurality of electrical receptacles mounted on said conveyor means in spaced relation along the outer surface thereof and electrically connected through said conveyor means to said conductors, a plurality of brackets mounted on said conveyor means and respectively disposed adjacent said receptacles, each of said brackets having a receptacle means therein and having a pair of normally closed resilient contacts connected to said receptacle means and normally providing a short circuit therefor, a stationary testing station supported adjacent said conveyor means at one end thereof, and a pair of electrically conductive parallel track sections connected to said testing station and extending parallel to said conveyor means along a portion of the travel thereof, said track sections being adapted to open said pair of contacts in said brackets and make respective electrical contact thereto as said brackets are moved past said testing station by said conveyor means.

8. An assembly for testing electrical units while in motion including in combination, a rectangular supporting table having a pair of spaced parallel channels extending along the length of the upper surface of its top and further having a shelf extending along the length of said table below said top with a plurality of spaced parallel supporting members mounted thereon and extending along the length of the table and defining passages therebetween, a pair of roller members supported at opposite ends of said table, a continuous belt encircling said rollers and the top of said table with the lower surface of its upper portion resting on said top and the lower surface of its lower portion resting on said supporting members, driving means mechanically coupled to one of said rollers for moving said belt over the top of said table from one end of said table to the other, a pair of spaced parallel flexible strips of conductive material secured to and extending lengthwise around the inner surface of said belt and passing through the aforesaid channels in the top of said table, a plurality of pairs of brackets for supporting electrical units to be tested mounted on said belt and spaced along the outer surface thereof, one bracket of each of said pairs having a receptacle means therein and having contact means connected to said receptacle means, a plurality of electrical outlets mounted on said belt adjacent respective ones of said brackets and electrically connected through said belt to said flexible strips, said brackets and said outlets passing through the aforesaid passages between said supporting members on said shelf, a pair of spaced annular conductive members supported on one of said roller members coaxially therewith and respectively engaging said flexible strips for electrically energizing said strips, a pair of energizing brushes respectively engaging said annular members for supplying electrical energy thereto from a stationary source, a stationary testing station supported adjacent said belt at said other end of said table, and electrical conductive track section means connected to said testing station and adapted to contact said contact means in said brackets as said brackets are moved past said testing station by said belt.

References Cited in the file of this patent

UNITED STATES PATENTS

| | | |
|---|---|---|
| 1,664,221 | Matthews et al. | Mar. 27, 1928 |
| 1,875,624 | Lowry | Sept. 6, 1932 |
| 1,960,614 | Anderson | May 29, 1934 |
| 2,077,317 | Gerace, Jr. | Apr. 13, 1937 |